No. 730,638. PATENTED JUNE 9, 1903.
D. E. GRIFFITHS.
WHEEL TIRE.
APPLICATION FILED FEB. 14, 1903.
NO MODEL.
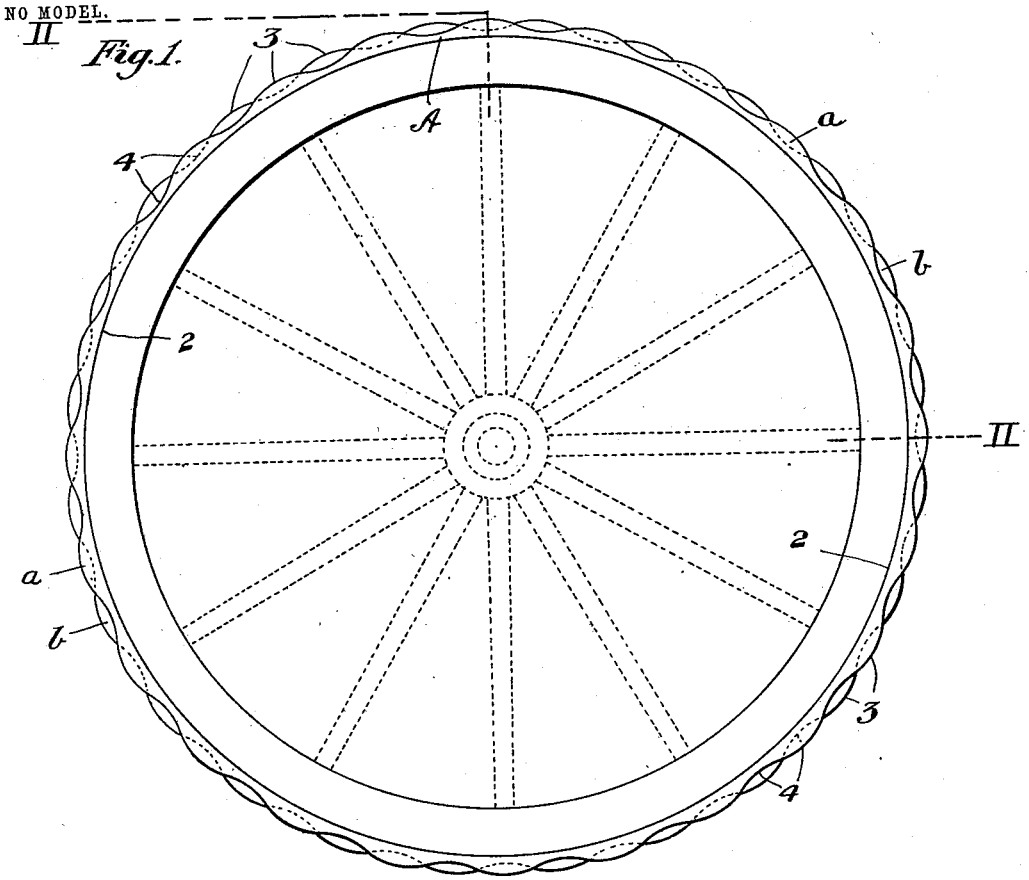
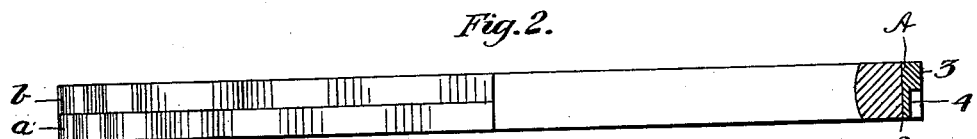
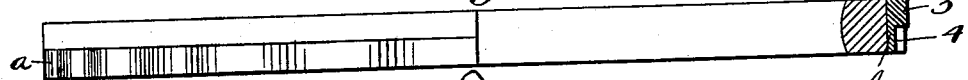
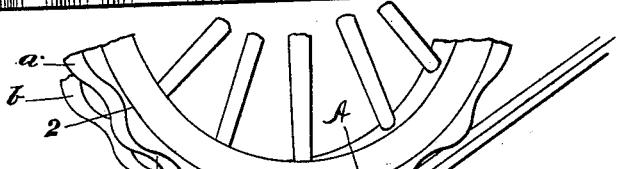
Witnesses:
Inventor.
Daniel E. Griffiths
by O. M. Clarke
his attorney.

No. 730,638. Patented June 9, 1903.

UNITED STATES PATENT OFFICE.

DANIEL E. GRIFFITHS, OF PITTSBURG, PENNSYLVANIA, ASSIGNOR TO JAMES B. COREY, OF PITTSBURG, PENNSYLVANIA.

WHEEL-TIRE.

SPECIFICATION forming part of Letters Patent No. 730,638, dated June 9, 1903.

Application filed February 14, 1903. Serial No. 143,373. (No model.)

*To all whom it may concern:*

Be it known that I, DANIEL E. GRIFFITHS, a citizen of the United States, residing at Pittsburg, in the county of Allegheny and State of Pennsylvania, have invented certain new and useful Improvements in Wheel-Tires, of which the following is a specification, reference being had therein to the accompanying drawings, forming part of this specification, in which—

Figure 1 is a view in side elevation of a wheel equipped with my improved tire. Fig. 2 is a plan view, partially in section, indicated by the line II II of Fig. 1. Fig. 3 is a similar view showing a modification. Fig. 4 is a perspective view showing the action of the tire in turning off of a track-rail.

My invention refers to improvements in tires for wheels of vehicles; and it has for its object to provide a tire which will permit the wheel to be turned off of a track-rail, thereby overcoming the slippage of the ordinary tire, especially with heavy loads or in case of slippery rails.

Referring to the drawings, A represents the body portion of the tire, which is preferably made in one continuous circular piece or in a straight section formed into a circle and joined at the ends. The tire is flat on its under side and adapted to fit upon the rim of the wheel in the usual manner, as indicated at 2. Upon its periphery the tire is formed by rolling or otherwise into two tread elements *a b*, each of which has an undulating contour consisting of closely adjacent rounded convex peripheral projections 3 and intervening rounded concave depressions 4. The convex extensions 3 of one set *a* are arranged intermediate of the projections 3 of the other set *b* and opposite the depressions therein, and vice versa, while the peripheral summits of both sets of projections conform to a common radius. As thus constructed and arranged the rolling weight is carried by the successively contacting projections, which being closely adjacent thus provide a practically continuous tread, approximating in action a smooth tire. When the vehicle is driven on a track, as an ordinary street-car track, and turned off to one side, the depression on the outer side, which is opposite the inner bearing projection, (which at the moment rests on the rail,) will allow for clearance of the rail-head and permit the next adjacent projection to swing out over the rail-head, as clearly shown in Fig. 4, so that it will then rest on the rail-head and the wheel will easily ride over it.

While in the principal figures of the drawings I have shown both sides of the tires as of the same form and while this is of advantage in permitting the tires to be used interchangeably with either side out, it will be observed that the operative or climbing portion of the tire will always be on the outside. The inner portion may therefore be made smooth, of the maximum height of the outer projections 3, as shown in Fig. 3, inasmuch as the purpose of such inner portion is to always hold the outer depressed concave surface above the top of the rail-head, so as to permit the next oncoming projection to be swung out over it in turning. The entire tire may also be made in two pieces, either both undulating or one (the outer) undulating and the other plain; but if both are made undulating care should be taken that in assembling them to provide a complete tire that the projections and depressions are alternated, as already described.

My invention will be found to be of great advantage in overcoming the difficulty of turning off of tracks with smooth tires, especially with heavy vehicles, while the rolling action of the wheel is not interfered with. It is very simple, cheap, and easily made and applied, while reducing frictional wear.

Changes and variations of the projections and depressions or in other details of construction may be made by the skilled mechanic; but all such are to be considered as within the scope of the following claims.

What I claim is—

1. A tire for vehicle-wheels having two series of alternating peripheral projections and depressions meeting at the middle of the wheel, the projections and depressions of one side being opposite the depressions and projections respectively of the other side, substantially as set forth.

2. A tire for vehicle-wheels having two series of alternating peripheral continuously-rounded projections and depressions meeting at the middle of the wheel, the projections and depressions of one side being opposite the depressions and projections respectively of the other side, substantially as set forth.

3. A tire for vehicle-wheels consisting of an integral hoop having a smooth inner side and provided with two series of alternating peripheral rounded projections and depressions meeting at the middle of the wheel, the projections and depressions of one side being opposite the depressions and projections respectively of the other side, substantially as set forth.

4. A tire for vehicle-wheels having two series of alternate peripheral projections and depressions extending at right angles to the edge across the tire, the projections and depressions of one side being opposite the depressions and projections respectively of the other side, substantially as set forth.

In testimony whereof I affix my signature in presence of two witnesses.

DANIEL E. GRIFFITHS.

Witnesses:
C. M. CLARKE,
R. H. McLARN.